United States Patent [19]

Doescher et al.

[11] Patent Number: 4,521,140

[45] Date of Patent: Jun. 4, 1985

[54] JIG

[76] Inventors: George C. Doescher; Jim W. Clark, both of P.O. Box 935, both of Houma, La. 70361

[21] Appl. No.: 538,150

[22] Filed: Oct. 3, 1983

[51] Int. Cl.³ .............................................. B23B 45/14
[52] U.S. Cl. ...................................... 408/97; 408/108; 408/236; 408/138
[58] Field of Search ................... 408/72 R, 72 B, 104, 408/90, 97, 102, 103, 108, 121, 138, 236, 241, 241 B

[56] References Cited

U.S. PATENT DOCUMENTS

| 672,284 | 4/1901 | Nuttall | 408/138 |
| 1,685,785 | 10/1928 | Muth | 408/241 B |
| 2,227,576 | 3/1942 | Anderson | 408/121 X |
| 2,384,071 | 9/1945 | Boyer | 408/97 |
| 2,669,889 | 2/1954 | Huller | 408/72 B X |

FOREIGN PATENT DOCUMENTS

1576 11/1889 Switzerland ......................... 408/97

Primary Examiner—Z. R. Bilinsky
Attorney, Agent, or Firm—William David Kiesel

[57] ABSTRACT

A jig is disclosed having a unique clamping assembly and tool support assembly having a novel tool support bushing allowing for accurate drilling or reaming in limited space and around obstructions.

4 Claims, 32 Drawing Figures

JIG

BACKGROUND OF THE INVENTION

1. Field of the Invention.

This invention relates in general to jigs used to support drills, reamers and like tools and, more particularly, to drill jigs useful in on-site marine engine and gear box hole drilling and reaming.

2. Prior Art.

A long time outstanding problem in the marine industry has been the oblong and mislocated (e.g., off center line) bolt holes found in marine engine foundations. This out-of-perpendicular orientation of the bolt holes causes the engine mount bolts to seat improperly and/or allow the bolt to shift within the opening. As a result, engine bolts become loosened, resulting in bolt failure due to bending as well as engine to clutch misalignment. These result in overstress of the transmission and cutless bearing leading to expensive and unnecessary maintenance costs.

Current apparatus and methods do not permit on-site bolt hole drilling and reaming accuracy necessary to produce true body bound engine mount bolt installation as called for by engine and clutch-transmission manufacturers. For example, magnetic base drills do not provide adequate support force to prevent drill bit moving laterally off-center when heavy side loads are induced by bits and reamers. Likewise, vacuum base drills cannot be utilized since engine mount brackets and transmission mount flanges are irregular shaped generally near the fillet radii of vertical flanges, thereby not providing sufficient space for adequate air sealing required by the vacuum base. Furthermore, current drill jigs utilized for drilling holes near edge of metal sheets are not satisfactory since they are designed to guide the drill rather than the drill bit and will not accommodate the tang of tapered shank drills and reamers. In addition, current drill bushings are not practical because the drilling forces utilized in this application would induce heavy side loads causing such bushings to shift laterally. Finally, dowel pin jigs, pipe taping, as well as current portable or fixed drill presses and lathes have not been able to produce the required accuracy or be adaptable for use for drilling engine and/or transmission mount bolt holes.

Exemplary of the current apparatus and methods are the disclosures described in the following patents:

| Patent No. | Inventor | Issue Date | Title |
|---|---|---|---|
| 3,552,238 | Quackenbush | 01/05/71 | STRUCTURE FOR POSITIVELY FEEDING TOOLS SUCH AS DRILLS AND THE LIKE |
| 3,552,239 | Yeaman, et al | 01/05/71 | PORTABLE DRILL PRESS |
| 3,587,391 | Pitts, et al | 06/28/71 | WORK SUPPORT MECHANISM |
| 3,626,513 | Pytlak | 12/07/71 | TOOL GUIDE |
| 3,677,655 | Ratteree | 07/18/72 | BRAKE DRUM TRUING METHOD AND APPARATUS |
| 3,677,656 | Buck | 07/18/72 | RADIAL POSITIONER, LOCK AND ROTARY CONTACTS FOR ELECTRO-MAGNETIC DRILL MOUNT |
| 3,685,916 | Loomis | 08/22/72 | BOLT HOLE DRILLING JIG FOR ELEVATOR INSTALLATION |
| 3,751,175 | Brooks | 08/07/73 | PORTABLE LINE BORING BAR ASSEMBLY |
| 3,756,736 | Marcoux | 09/04/73 | DRILL BUSHING SYSTEM |
| 3,758,933 | Gross | 09/18/73 | PRESSURE FOOT GUIDE DEVICE |
| 3,833,313 | Gallion | 09/03/74 | DRILLING DEVICE |
| 3,851,990 | West | 12/03/74 | DISPOSABLE DRILL GUIDE AND METHOD FOR DRILLING WORKPIECES |
| 3,922,107 | Fowler | 11/25/75 | SEWER TAPPING METHOD AND APPARATUS |
| 3,992,122 | Maxey | 11/16/76 | HIGH VELOCITY |
| 4,005,945 | Gutman | 02/01/77 | DRILL GUIDE |
| 4,105,358 | Walker | 08/08/78 | SUPPORT DEVICE FOR PIPE DRILLER |
| 4,132,496 | Casto | 01/02/79 | PRECISE ANGLE DRILLING ATTACHMENT |
| 4,197,041 | Prewitt | 04/08/80 | BORING TOOL |

SUMMARY OF THE INVENTION

Therefore, it is an object of this invention to provide a jig which permits accurate on-site bolt hold drilling and reaming.

Another object of this invention is to provide a jig that can be mounted in close quarter situations, such as found in marine engine and transmission mount locations.

Still another object of this invention is to provide a jig that prevents a drill bit from moving laterally off-center when heavy side loads are induced.

A further object of this invention is to provide a jig that can be quickly and accurately positioned for use.

Other objects and advantages of this invention shall become apparent from the ensuing descriptions of the invention.

Accordingly, a jig for supporting a drill or similar tool during its drilling or similar operation is provided comprising a clamping assembly having an upper and lower clamping bar hingedly attached to one another by a pivoting assembly and having a bar spreader assembly attached at one end of the bars, a tool support assembly attached to the upper clamping bars and having a vertically adjustable means for proper height positioning of the drill or similar tool over the predetermined hole location and having a tool support attached to the upper bar through which the tool extends to the hole location, and tool support bushing attachable to the tool support and fitting inside same to further support the drill bit or similar device.

PREFERRED EMBODIMENTS OF THE INVENTION

Figure 1:
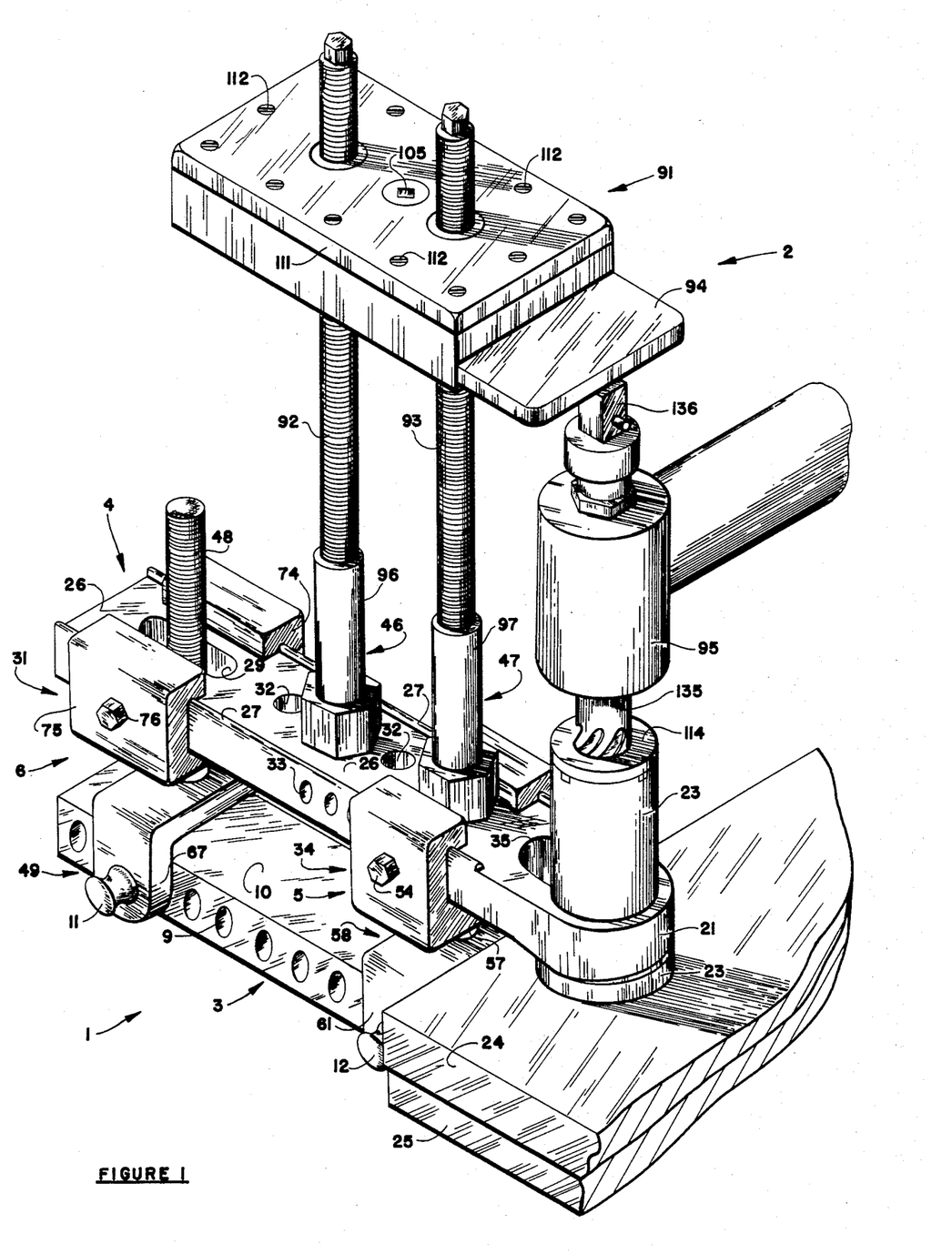
FIG. 1 is a three-dimensional view of a preferred embodiment of the drill jig of this invention.
Figure 2:
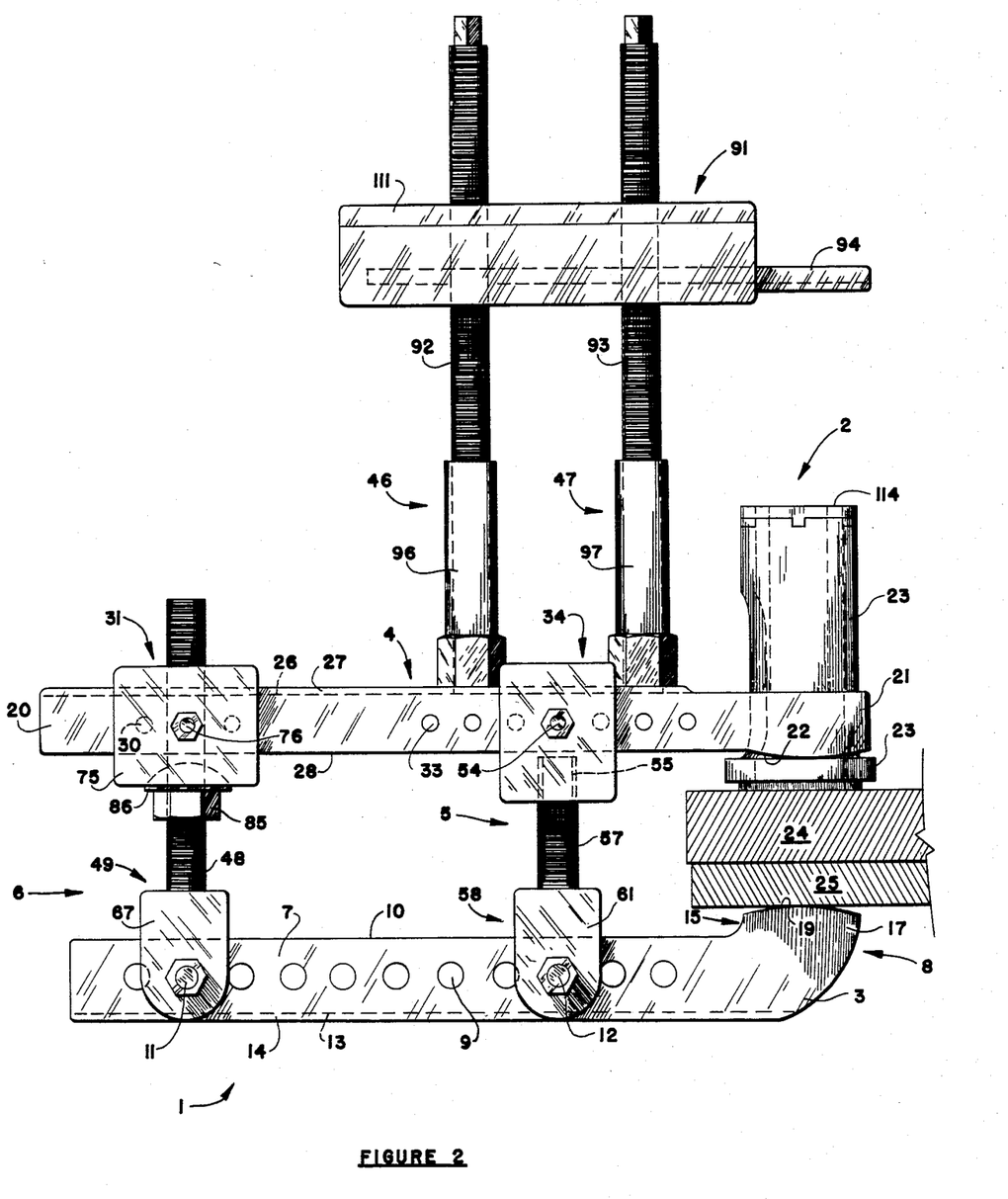
FIG. 2 is a side view of a preferred embodiment of the drill jig of this invention.

With no intent of restricting the scope of this invention, the preferred embodiments of this invention are discussed when utilizing this jig as a drill jig. Turning now to FIGS. 1 and 2, the jig comprises, in general, clamping assembly 1 and tool support and feed assembly 2. The clamping assembly 1 comprises a lower clamping bar 3 and an upper clamping bar 4 attached to one another in a relationship described below by pivoting assembly 5 and spreader assembly 6.

Figure 3A:
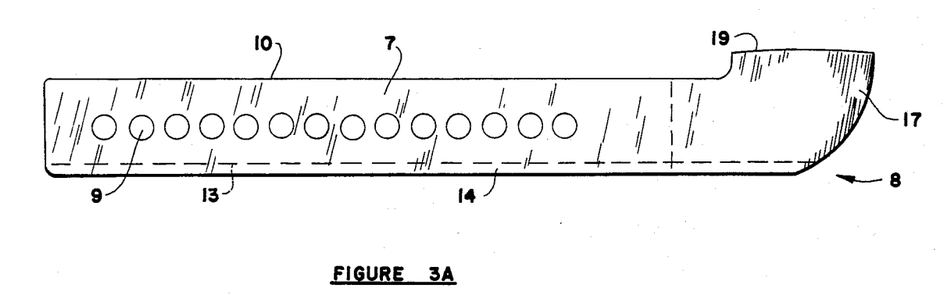
FIG. 3A is a side view of a preferred embodiment of the lower clamping bar.
Figure 3B:
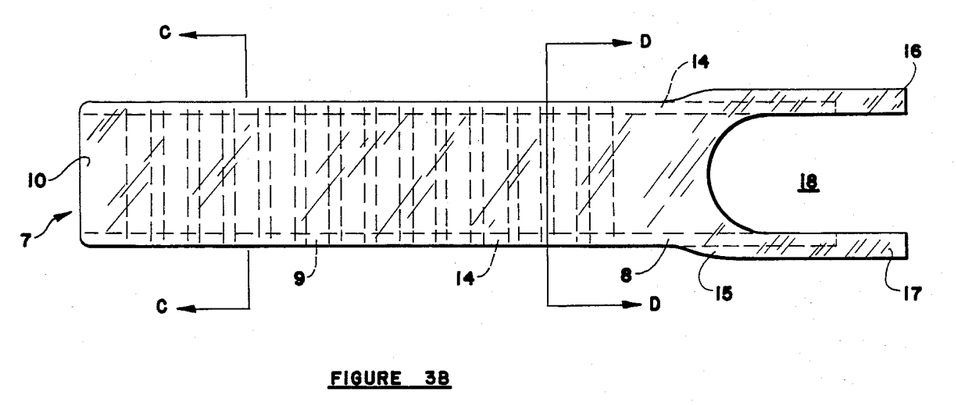
FIG. 3B is a top view of a preferred embodiment of the lower clamping bar.
Figure 3C:
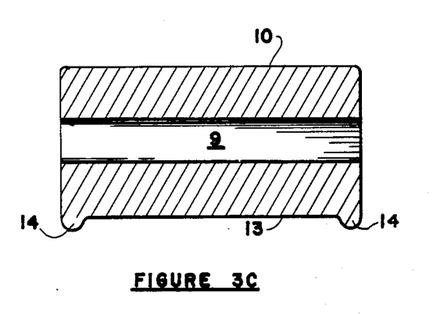
FIG. 3C is a cross-sectional view taken along lines A—A of FIG. 3B.
Figure 3D:
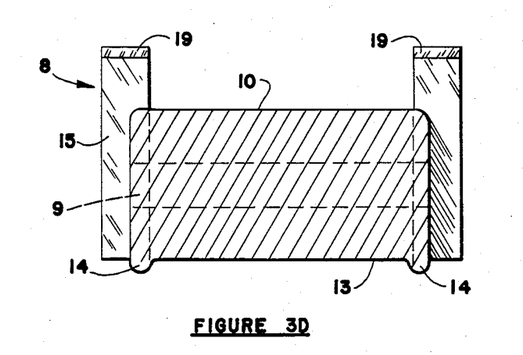
FIG. 3D is a rear end view of a preferred embodiment of the lower clamping bar.

Lower clamping bar 3 in a preferred embodiment (See FIGS. 3A–C) is constructed of a rectangular shaped block 7 provided with a raised clamping jaw 8. Block 7 has a series of openings 9 drilled parallel to the flat top surface 10 to accommodate the spreader assembly pin 11 and the pivoting assembly hinge pin 12. The flat bottom surface 13 is provided with parallel ridges 14 which run the length of block 7 and part of jaw 8, as shown. Jaw 8 has an arcuate, convex section 15 extending upward from the end of block 7 to form two tines 16 and 17 which create a horse-shoe shaped slot 18 at the front end of lower clamping bar 3. The top of each tine is preferably provided with an arcuate shaped surface 19 to allow for proper positioning of the jig during the clamping operation.

Figure 4:
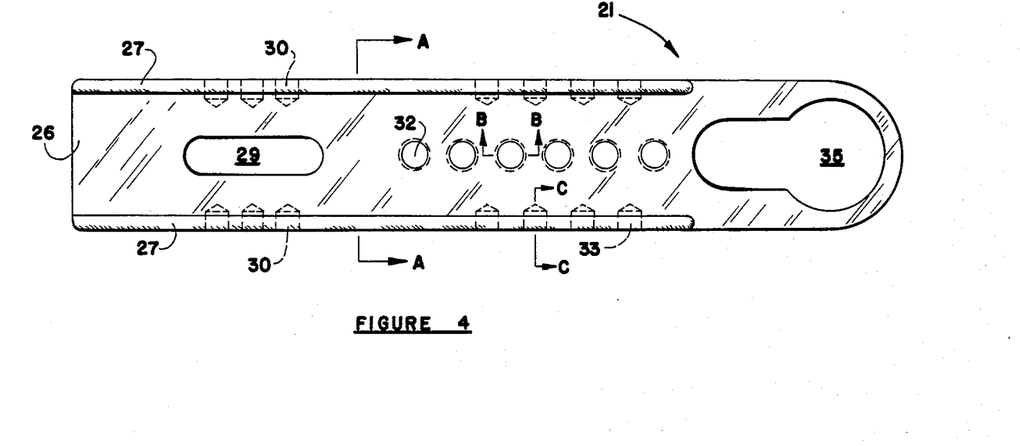
FIG. 4 is a top view of a preferred embodiment of the upper clamping bar.
Figure 4A:
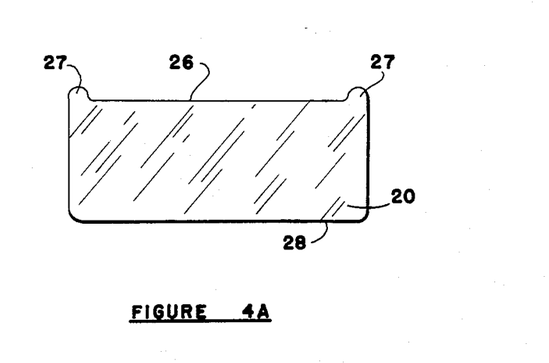
FIG. 4A is a cross-sectional view taken along lines A—A of FIG. 4.
Figure 4B:
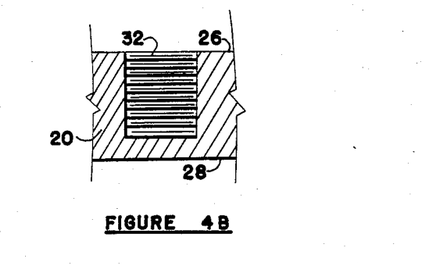
FIG. 4B is a cross-sectional view taken along lines B—B of FIG. 4.
Figure 4C:
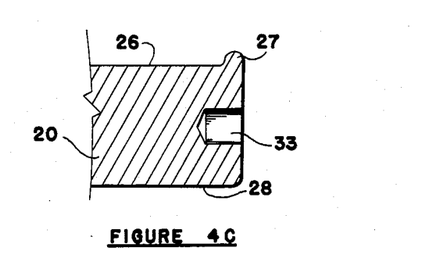
FIG. 4C is a cross-sectional view taken along lines C—C of FIG. 4.
Figure 4D:
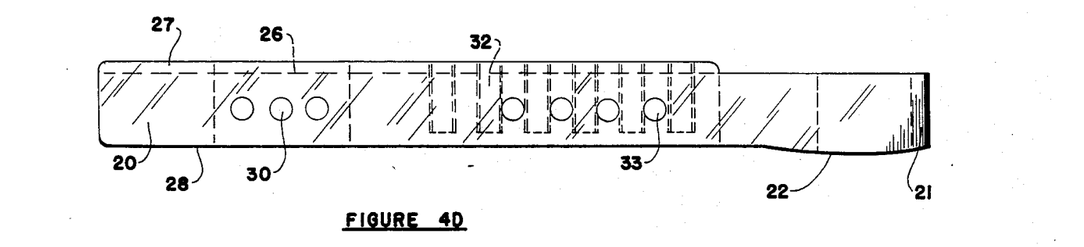
FIG. 4D is a side view of a preferred embodiment of the upper clamping bar.

Turning now to FIGS. 4–4D, a preferred embodiment of upper clamping bar 4 is illustrated. It is constructed from a rectangular shaped block 20 provided with a jaw member 21, having a lower arcuate, convex shaped surface 22 which, when pressed against bushing support 23 positioned on engine mount bracket 24 (See FIGS. 1 and 2) and working in clamping conjunction with jaw 8 pressed against engine foundation 25, allows for proper positioning of the jig. Block 20 has a flat upper surface 26 with parallel ridges 27 along the side perimeter of block 20 as shown and a flat bottom surface 28. An elongated oval shaped slot 29 is cut to form an opening between block surfaces 26 and 28, as shown. A series of openings 30 are drilled into both sides of block 20 opposite the elongated section of slot 29 and, as explained below, are used to securely position upper spreader assembly positioning plate 31. A series of threaded openings 32 are drilled perpendicularly into surface 26 and positioned along the center line of surface 26 at the end adjacent jaw member 21. A second series of openings 33 are drilled into both sides of block 20 facing threaded openings 32, as shown, and, as explained below, are used to securely position upper pivoting assembly positioning plate 34. Finally, jaw member 21 is provided with a slot 35 shaped to receive tool bushing support 23.

Figure 5:
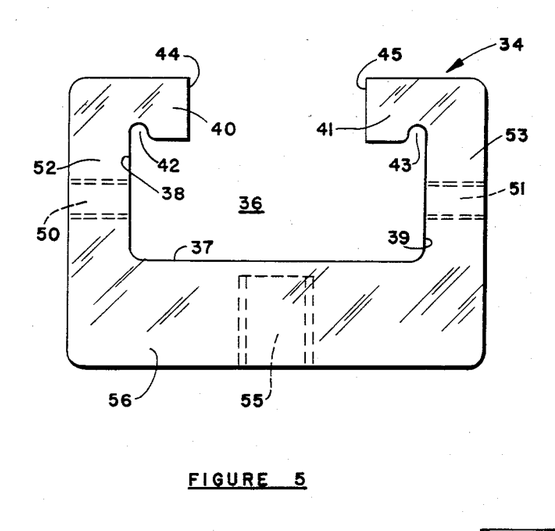
FIG. 5 is an end view of the upper pivot hinge which attaches to the upper clamping bar of the jig.
Figure 6:
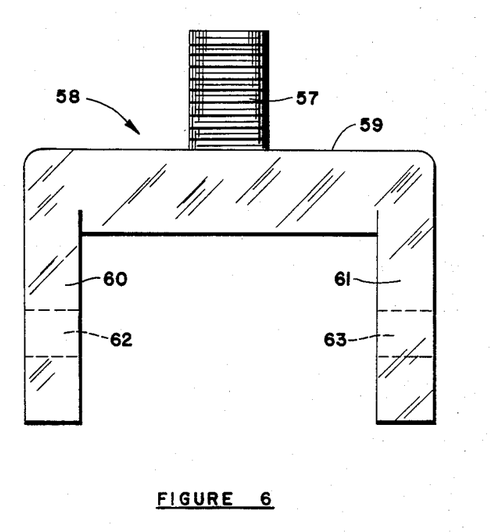
FIG. 6 is an end view of the lower pivot hinge pivotly attached to the lower clamping bar of the jig.
Figure 7:
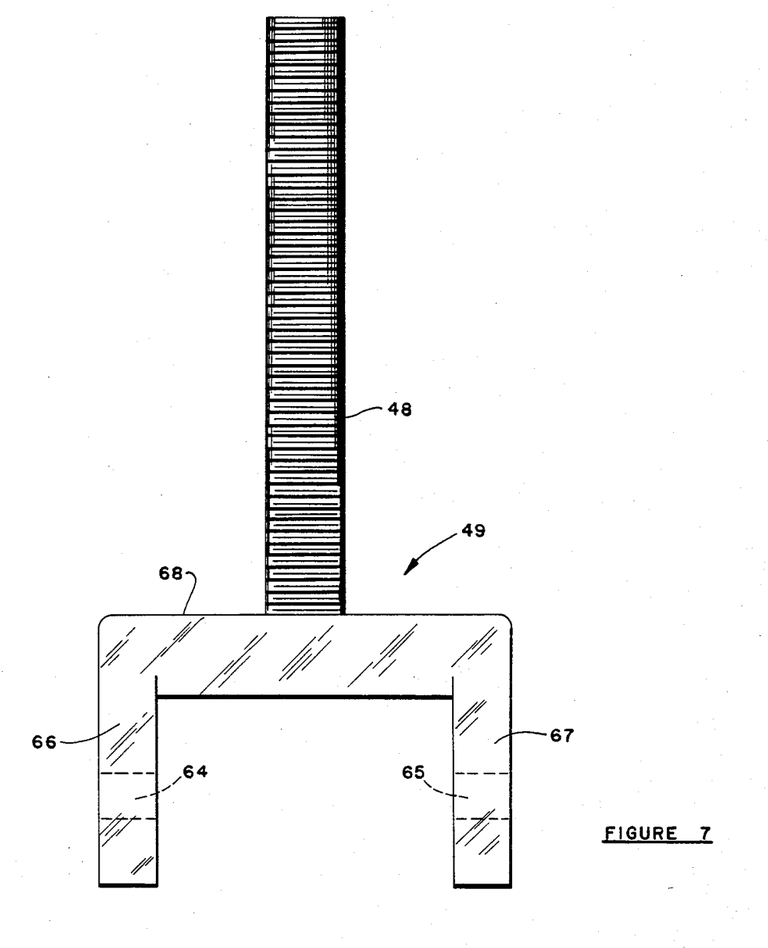
FIG. 7 is an end view of the lower spreader hinge pivotly attached to the lower clamping bar of the jig.
Figure 8:
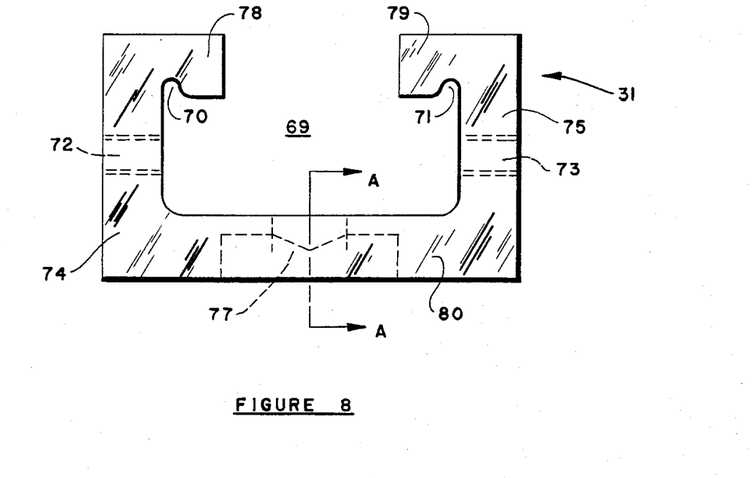
FIG. 8 is an end view of the upper spreader hinge which attaches to the upper clamping bar of the jig.
Figure 8A:
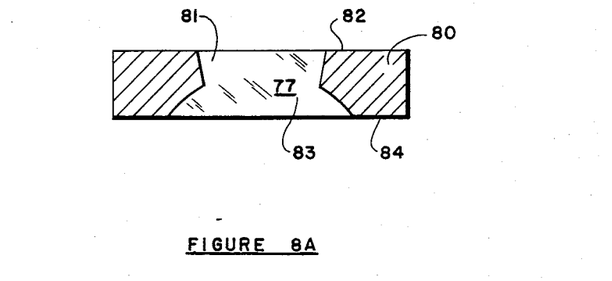
FIG. 8A is a cross-sectional view taken along lines A—A of FIG. 8.
Figure 9:
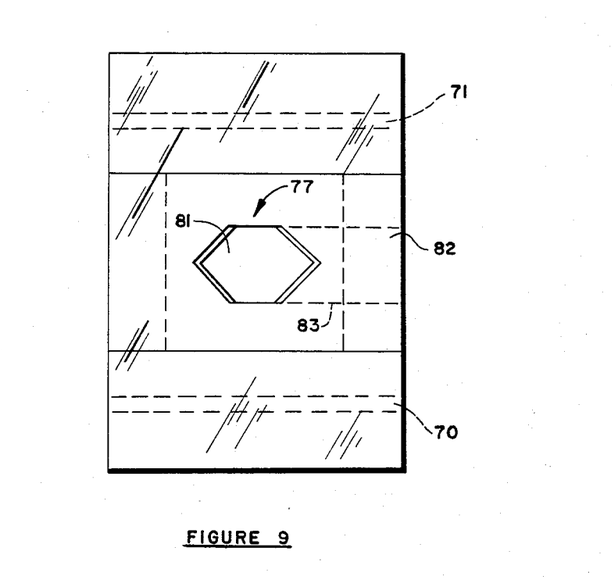
FIG. 9 is a top view of the upper spreader hinge.

Turning back to FIGS. 1 and 2, pivoting assembly 5 is shown to comprise upper positioning plate 34 (detailed in FIG. 5) and lower positioning plate 58 (detailed in FIG. 6). Upper positioning plate 34 is constructed from a metallic block having a channel 36 running from one end of the block to the other and shaped to fit about upper clamping bar 4 and slide horizontally on ridges 27, as shown. More particularly, channel 36 is formed in plate 34 by a flat bottom surface 37 and parallel flat side surfaces 38 and 39, which are provided with shoulder member surfaces 40 and 41, respectively, extending perpendicularly and facing one another, as shown. Each shoulder member 40 or 41 surface is provided with a groove 42 or 43, respectively, that serve to receive and move on ridges 27. The opposing faces 44 and 45 of shoulder member surfaces 40 and 41, respectively, are separated a sufficient distance to allow plate 34 to slide past the upper support nuts 46 and 47 of the tool support assembly 2, as well as threaded stud 48 attached to lower spreader positioning plate 49.

Plate 34 has aligned threaded openings 50 and 51 drilled through its side walls 52 and 53, respectively, at a position that when bolts 54 are screwed through openings 50 and 51, they will enter openings 33. Finally, a third threaded opening 55 is drilled partially through in the bottom 56 of plate 34 to receive threaded stud 57 of lower positioning plate 58 of pivoting assembly 5.

Plate 58 is constructed having a U-shaped cross-section wherein threaded stud 57 extends perpendicularly upward from plate surface 59 so that when plate 58 is properly positioned on lower clamping bar 3, stud 57 can be threaded in opening 55 of upper plate 34. Parallel side walls 60 and 51 are provided with aligned openings 62 and 63 so that hinge pin 12 can pass through openings 62 and 63 and opening 9 of lower clamping bar 3.

Turning now to FIGS. 1 and 2 and the detailed FIGS. 7, 8, 8A and 9, spreader assembly 6, in a preferred embodiment, is seen to comprise a second lower positioning plate 49 and a second upper positioning plate 31. Plate 49 is constructed similarly to lower positioning plate 58 of the pivoting assembly 5 in that it has openings 64 and 65 in its side walls 66 and 67, respectively, so that pin 11 can pass through openings 64 and 65 and opening 9 of lower clamping bar 3. Plate 49 is also provided with threaded stud 48, which extends perpendicularly upward from surface 68. Stud 48 is of sufficient length to extend through slot 29 of upper clamping bar 4 when the jig is assembled for use as shown in FIG. 1.

Figure 10:
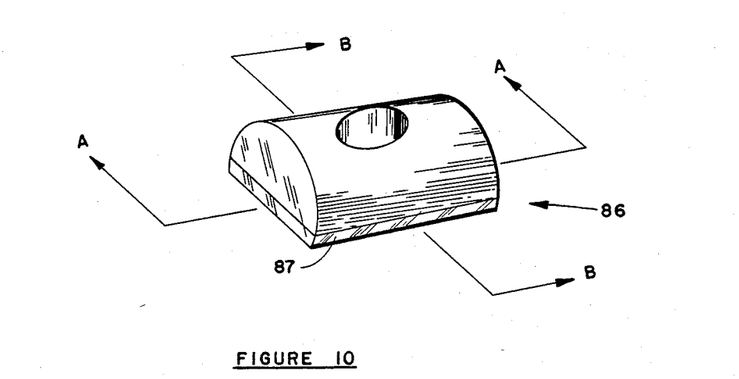
FIG. 10 is a three-dimentional view of the washer utilized with the upper spreader hinges.
Figure 10A:
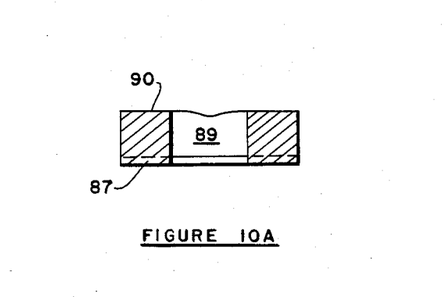
FIGS. 10A and 10B are, respectively, views taken along lines A—A and B—B of FIG. 10.
Figure 10B:
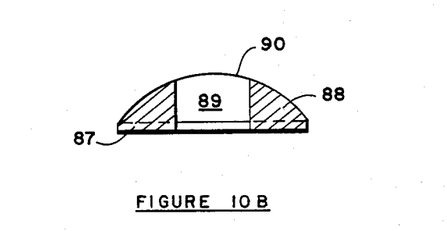

Upper positioning plate 31 (See FIGS. 8, 8A and 9 for detailed views) of spreader assembly 6 is provided with a channel 69 having the same cross-sectional configuration as that of channel 36 of upper pivoting assembly positioning plate 34. Thus, plate 31 can be slid on ridges 27 which fit in grooves 70 and 71 of shoulder members 78 and 79, respectively. In addition, threaded openings 72 and 73 are provided in sides 74 and 75 so that bolts 76 can be screwed through these openings and into one of openings 30 of upper clamping bar 4 to secure plate 31 in the desired position. Plate bottom 80 has a preferred drilled opening 77 that is formed by sloped wall elliptical shaped opening 81 in the top surface 82 of bottom 80 and an arch-shaped opening 83 in the bottom surface 84 of bottom 80 as seen in the Figures. This preferred opening 77 will allow for the pivoting of stud 47 during the clamping of the jig on the engine mount bracket 24 and engine foundation 25. To achieve smooth pivoting, a hex nut 85 and washer 86 (See FIG. 2) is used. In a preferred embodiment (See FIGS. 10, 10A and 10B), washer 86 is shaped to fit in openings 81 and 83. More particularly, washer 86 has a flat square bottom 87, an arch shaped cross-section side 88 with circular opening 89 drilled perpendicularly and centered on arch surface 90.

As is more clearly understood by referring to FIGS. 1 and 2, to clamp and tighten the jig in place on bracket 24 and foundation 25, plates 31 and 34 are slid on ridges 27 to their appropriate desired location. Plates 49 and 58 are positioned on lower clamping bar and fixed in position by pins 11 and 12 after stud 48 is extended through plate 31 and slot 29 and after stud 57 is screwed into threaded opening 55. Next, bushing support 23 is positioned through upper clamping bar slot 35, as shown. Hex nut 85 is screwed down stud 48 a sufficient distance to allow jaws 8 and 21 to spread wide enough to fit about bracket 24 and foundation 25. The hex nut 85 is screwed upward forcing jaws 8 and 21 together, thus creating a very rigid clamp. In the preferred embodiments, the convex curvature in jaw surfaces 19 and 22 in conjunction with the shape of slot 35 assures that bushing support 23 is clamped perependicular to bracket 24.

The tool support assembly 2 comprises gearing assembly 91 operatively supported upon drive screws 92 and 93, drive plate 94 and tool or bushing support 23 as seen in FIG. 1.

Drive screws 92 and 93 are screwed through nuts 46 and 47, respectively, which nuts have elongated sleeves 96 and 97 to provide structural support for the screws. Screws 92 and 93 are properly positioned by screwing them, preferably as far as possible, into the appropriate adjacent openings 32 with nuts 46 and 47 screwed down to upper surface 26 of upper clamping bar 4.

Figure 11:
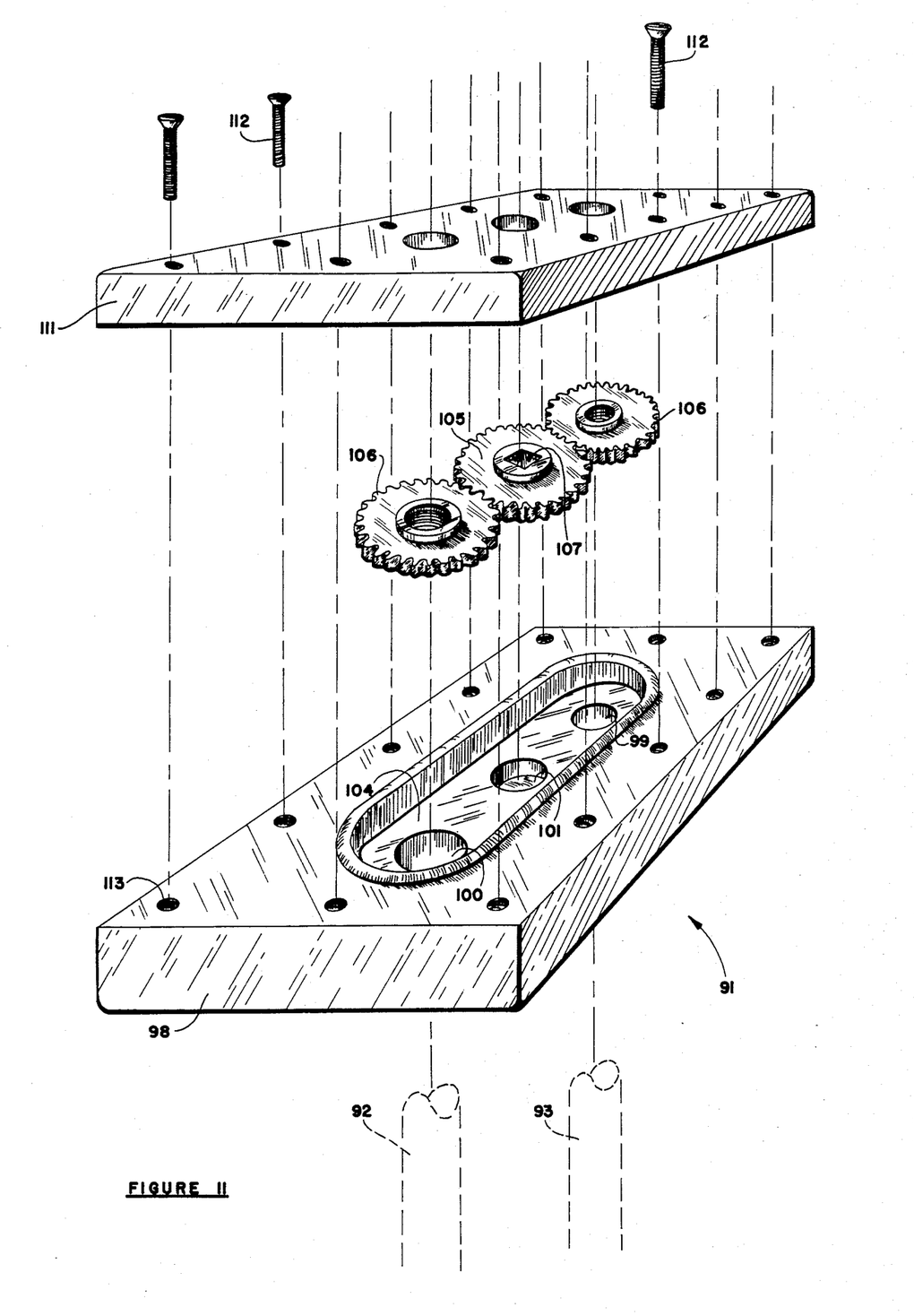
FIG. 11 is an exploded view of a preferred embodiment of the base gear box.
Figure 11A:
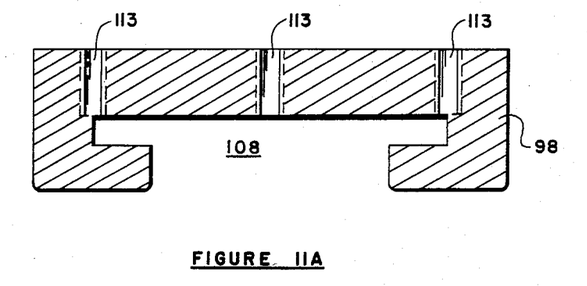
FIG. 11A is a cross-sectional view taken along lines A—A of FIG. 11.
Figure 11B:
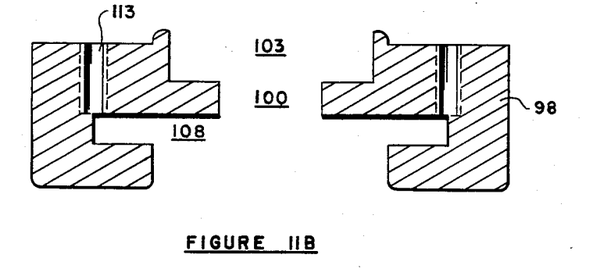
FIG. 11B is a cross-sectional view taken along lines B—B of FIG. 11.
Figure 11C:
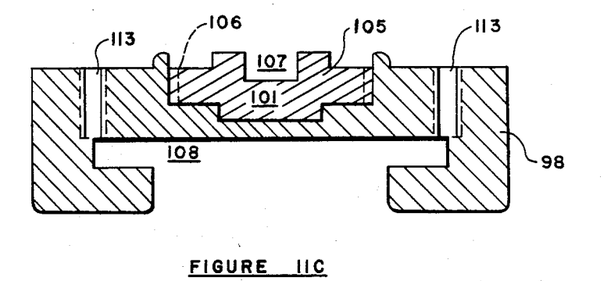
FIG. 11C is a cross-sectional view taken along lines C—C of FIG. 11.
Figure 11D:
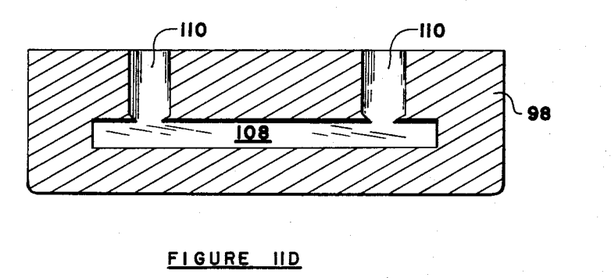
FIG. 11D is a cross-sectional view taken along lines D—D of FIG. 11.
Figure 12:
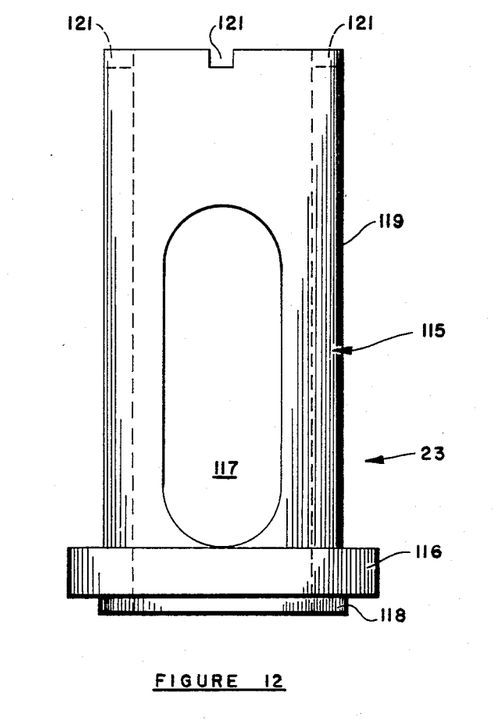
FIG. 12 is a side view of the tool support showing the cutting openings.
Figure 12A:
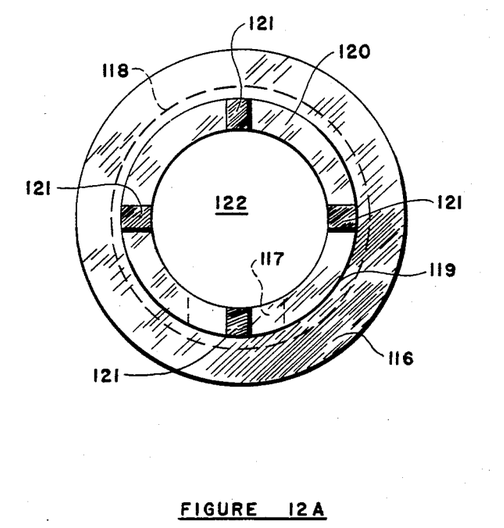
FIG. 12A is a top view of FIG. 14.

Turning now to FIGS. 11–11D, a preferred embodiment of gear assembly 91 is illustrated. Gear box 98 is provided with two drive screw openings 99 and 100 to receive drive screws 92 and 93, respectively, and positioned on opposite sides of gear drive cavity 101. The upper section 102 and 103 of openings 99 and 100, respectively, are connected with cavity 101 by elongated slot 104. Gear drive 105 thus sits in cavity 101 and is positioned so that its gears 106 are operatively engaging drive screws 92 and 93. In a preferred embodiment, drive gear 105 is provided with a square drive cavity 107 in which a ratchet head or similar means can be fitted to turn gear drive 105 causing gearing assembly to move up or down drive screws 92 and 93. In another preferred embodiment, gear box 98 is provided with a slot 108 into which drive plate 94 is positioned. In a preferred embodiment, drive plate 94 is provided with studs 109 which fit into gear box rear openings 110 so that when gear box cover 111 is fixed in position by screws 112 that screw into threaded openings 113, the drive plate is held in rigid position.

Referring now to FIGS. 12–14A, preferred embodiments of tool support 23 and various type bushings 114 are illustrated. Tool support 23 comprises a cylindrical body 115 having a bottom ring 116 extending outward for jaw member 21 to rest and a slot 117 extending from ring 116 partially up body 115 to provide a viewing port as well as an opening for cuttings to escape. In a more preferred embodiment, body section 118 located below ring 116 is of wider outside diameter than the upper section 119 of body 115 in order to provide additional structural support to ring 116 when jaw member 21 is pressing down on ring 116. Finally, the top 120 of body 115 is provided with notches 121 for alignment of bushings 114 that will be positioned in the passageway 122 that extends through the vertical center axis of body 115.

Figure 13:
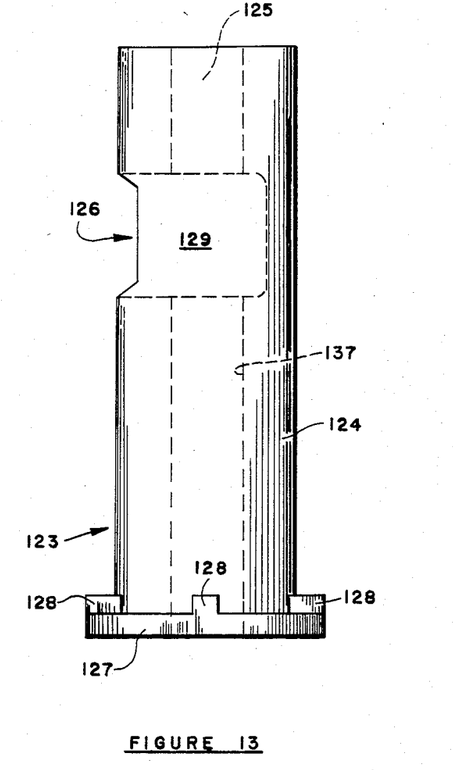
FIG. 13 is a pilot drill tool support bushing utilized in a preferred embodiment of this invention.
Figure 13A:
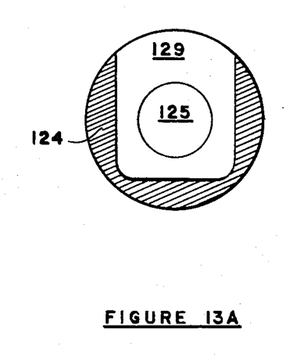
FIG. 13A is a cross-sectional view taken along lines A—A of FIG. 12.
Figure 13B:
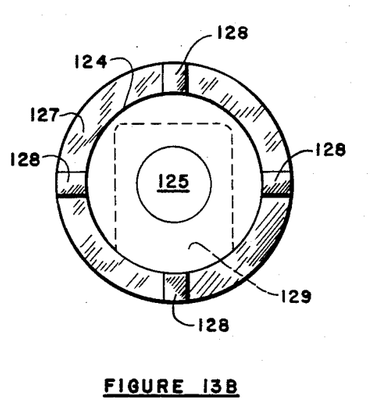
FIG. 13B is a top view of FIG. 12.

FIGS. 13–13B depict a preferred embodiment of a pilot drill tool bushing 123 comprising a hollow cylindrical body 124 having center passageway 125 for a drill bit to pass through body 124, a slot 126 positioned to align with bushing support slot 117 when bushing 123 is positioned in bushing support 23. Body 124 is provided with top lip 127 having protrusions 128 that mate into notches 121 of bushing support 23. In a preferred embodiment, passageway 126 is wider in the area 129 about slot 126. In another preferred embodiment, bushing passageway 125 is sized so only a small tolerance is allowed between drill bit 135 and the interior surface 137 of passageway 125.

Figure 14:
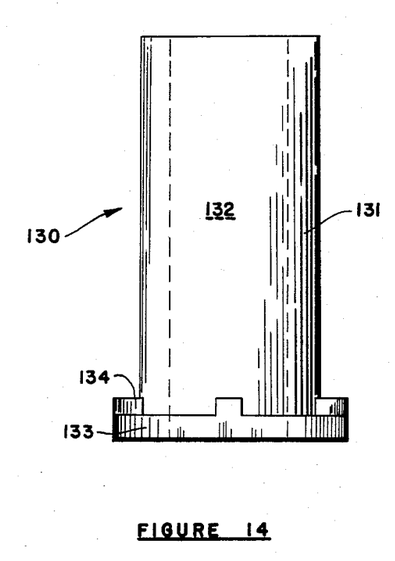
FIG. 14 is a drill tool support bushing utilized in a preferred embodiment of this invention.
Figure 14A:
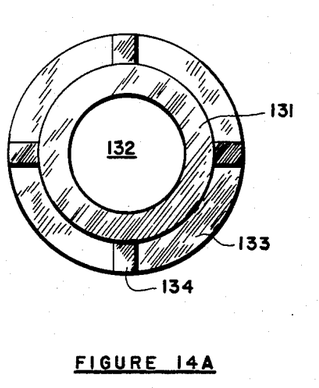
FIG. 14A is a top view of FIG. 13.

FIGS. 14 and 14A depict a preferred embodiment of drill tool or rear tool bushing 130 comprising cylindrical body 131 having a center axis passageway 132 and having a lip 133 provided with protrusion 134 for mating with notches 121 of bushing support 23.

To drill or ream the desired hole in bracket 24, clamping assembly 1 is positioned about bracket 24 and foundation 25 as explained above. The desired bushing 114 is positioned into bushing support 23 and drive plate 94 raised by turning gear drive 105 until drill 95 can be positioned with its bit 135 in bushing 114. Drive plate 94 is then lowered onto drill head block 136 and with drill 95 turned on, plate 94 is continued to be lowered until the desired hole is cut. Thus, with the jig described, accurate drilling is assured.

There are, of course, many obvious alternate embodiments not specifically disclosed, but which are intended to be included within the scope of this invention as defined by the following claims.

What I claim is:

1. A jig for supporting a drill or similar tool during operation which comprises:
   (a) a clamping assembly having an upper and lower clamping bar hingedly attached to one another by a movable pivoting assembly and having means movably attached at one of the opposing ends of the upper and lower bars to spread and contract the distance between the opposing ends, and
   (b) a tool support assembly having vertically adjustable support means attached to the upper clamping bar and having a plate attached to the support means and pressingly contactable to the drill in its operative position wherein a bushing support extends through the upper clamping bar and is provided with a hollow bushing fitable therein and through which passes a tool bit attached to the drill; and wherein
      i. the upper clamping bar comprises an elongated metallic bar having at one end an upper jaw member provided with a convex lower surface and an opening through which the bushing support extends, and the upper clamping bar is provided with openings on its opposite sides and wherein a series of parallel passageways are drilled completely through the side of the lower clamping bar;
      ii. the lower clamping bar comprises an elongated metallic bar having at one end a lower jaw member opposing the upper jaw member and provided with a convex upper surface; and
      iii. the pivoting assembly comprises an upper positioning plate having side walls extending upward on either side of the upper clamping bar, the side walls being provided with side wall threaded openings aligned with the openings of the upper clamping bar; a lower positioning plate having side walls extending downward on either side of the lower clamping bar, the side walls of the lower positioning plate being provided with side wall openings aligned with the parallel passageways of the lower clamping bar; attaching means for fixedly attaching the upper and lower positioning plates to one another; bolts of sufficient length to screw through the side wall threaded openings of the upper positioning plate and into openings of the upper clamping bar; and a pin of sufficient length to pass through the side wall openings of the lower positioning plate and one of the passageways of the lower clamping bar.

2. A jig according to claim 1 wherein:
   (a) the upper clamping bar is provided with a series of parallel openings on its opposite sides at the end opposite its jaw member and a slot cut through from the top to the bottom of the upper clamping bar at its end opposite its jaw member,
   (b) the lower clamping bar is provided with a series of parallel passageways which extend through its sides at its end opposite its jaw member,
   (c) a second lower positioning plate having side walls extending downward on either side of the lower clamping bar, the side walls being provided with openings alignable with one of the parallel passageways to allow a pin to pass therethrough,
   (d) a threaded spreader guide rod extending perpendicularly from and connected to the top surface of lower positioning plate a sufficient distance to extend through the slot,
   (e) a second upper positioning plate having side walls extending upward on either side of the upper clamping bar and with an opening through its base through which the spreader guide rod extends, and
   (f) a nut having a diameter greater than the opening of the base of the second upper positioning plate and attached to the spreader guide rod for screwing vertically thereon.

3. A jig according to claim 1 wherein the vertically adjustable support means comprises:
   (a) a pair of threaded rods perpendicularly attached to a top surface of the upper clamping bar, and
   (b) a gear drive rotatably mounted in a gear box and positioned to operatively engage the threaded rods, the gear box being constructed to move vertically as the gear drive is rotated.

4. A jig according to claim 3 wherein elongated nuts are screwed to each of the threaded rods and positioned adjacent the upper clamping bar.

* * * * *